WILLIAM P. EWALD
INVENTOR.

March 17, 1970  W. P. EWALD  3,500,736
COINCIDENCE TYPE RANGEFINDER

Filed Jan. 31, 1968  4 Sheets-Sheet 2

WILLIAM P. EWALD
INVENTOR.

BY *William F. Delaney Jr.*
*Robert W. Hampton*

ATTORNEYS

WILLIAM P. EWALD
INVENTOR.

BY William F. Delaney Jr.
Robert W. Hampton
ATTORNEYS

March 17, 1970  W. P. EWALD  3,500,736
COINCIDENCE TYPE RANGEFINDER

Filed Jan. 31, 1968  4 Sheets-Sheet 4

WILLIAM P. EWALD
INVENTOR.

BY William F. Delaney Jr.
Robert W. Hampton

ATTORNEYS

United States Patent Office 3,500,736
Patented Mar. 17, 1970

3,500,736
COINCIDENCE TYPE RANGEFINDER
William P. Ewald, Rochester, N.Y., assignor to Eastman Kodak Company, Rochester, N.Y., a corporation of New Jersey
Filed Jan. 31, 1968, Ser. No. 702,106
Int. Cl. G03b 3/00
U.S. Cl. 95—44                        14 Claims

ABSTRACT OF THE DISCLOSURE

A coincidence type rangefinder system for use with interchangeable objectives is disclosed having focus-indicating refracting means provided with more than one available refracting power to deviate light at more than one angle, so that maximum focusing sensitivity may be attained for each of a plurality of different aperture objectives. In one embodiment of the invention, the focus indicator comprises a pair of lens elements which are movable in the primary image plane of the system with respect to the optical axis of the objective and each other, thereby changing the angle of deviation of light transmitted from the objective to the exit pupil. This ability to vary the effective deviating power of the refracting means with respect to the optical axis of the objective permits variation of the sensitivity of the system.

Background of the invention

This invention relates to rangefinder systems, and more particularly to coincidence rangefinders of the type in which oppositely oriented refracted elements refract image light from separate off-axis portions of an objective to form two rangefinding images which coincide when the objective is in a focused condition. Such rangefinders are generally of the split-image type or the superimposed image type.

Coincidence rangefinders using oppositely oriented refracting elements are particularly suitable for incorporation into viewfinders of single lens reflex cameras for focusing the objective lenses. Such cameras include a reflecting means between an adjustable objective lens and the film plane. The reflecting means in some reflex cameras is a beam splitter, but more commonly it is a hinged mirror mounted within the camera for pivotal movement between a substantially horizontal picture-taking position and an inclined viewfinding position. In the picture-taking position the hinged mirror is out of the path of light rays entering through the objective so that these light rays may impinge directly upon the film plane perpendicular to the optical axis of the objective. In viewfinding position the mirror directs the light rays entering through the objective to a primary image plane in which a ground glass screen and an image-splitting focus indicator are commonly located. Beyond this plane in the optical path of the light rays there are usually a prism and an eyepiece. The objective forms an image in the primary image plane, and means are provided for adjusting the objective to focus the image in that plane. The primary image plane in the viewfinder is at the same optical distance from the objective as the film plane, so that adjusting the objective to form a focused image in the primary image plane provides an effective focus adjustment of the objective with respect to the film plane.

When the split-image type of coincidence rangefinder is incorporated in the viewfinder of a single lens reflex camera, the image-splitting focus indicator comprises oppositely oriented refracting elements which are usually a pair of prisms located adjacent each other in the primary image plane in the viewfinder with the principal refracting planes of the prisms crossing on the optical axis of the camera objective. The two prisms, often referred to as crossed-wedges, divide part of the viewfinder field into two portions, which define two rangefinding images formed by light rays refracted from separate off-axis portions of the objective. These two off-axis portions of the objective define the base line of a rangefinder triangle, which is fundamental to most rangefinding systems. The wedges are designed such that the rangefinding images coincide when the image formed by the objective is properly focused in the primary image plane. In other words, when the wedges lie in the focal plane of the objective, the magnification and position of the rangefinder images are not affected by the wedges, so that the images coincide even though they are formed by different portions of the objective. However, when the wedges are not in the focal plane of the lens, the rangefinder images are displaced laterally with respect to the optical axis in opposite directions, thereby forming a split image. The amount of separation of the split rangefinder images indicates the extent to which the objective is out of focus. The objective lens may then be adjusted until the rangefinder images are aligned, which indicates that the camera is in proper focus.

One of the most significant factors which limits the sensitivity of rangefinders is the base separation of the system, that is the length of the base line of the rangefinding triangle. In the case of coincidence rangefinders of either type in reflex cameras, the base separation is limited by the diameter of the aperture stop of the objective lens. This is due to the fact that the entrance pupil for each of the two image fields of the rangefinder is in image of the eyepiece, deviated by one of the refracting means, as seen through the front of the system. Thus, the rangefinding system has two entrance pupils which are diametrically opposed with respect to the optical axis of the objective and which must fall within the diameter of the camera objective. The separation between these entrance pupils defines the base separation of the system, and limits the sensitivity of the system, that is the amount of separation of the rangefinding images for a given displacement of the crossed wedges from the focal plane of the objective. Accordingly, the refracting elements in coincidence rangefinders must be designed with a light deviating power which will keep the rangefinder entrance pupils within the aperture of the objective.

A disadvantage of prior are coincidence rangefinders is that focus-indicating refracting means designed for maximum base separation with high aperture objective cannot be used with lower aperture lenses, because the rangefinder entrance pupils would not fall within the aperture of the lower aperture lens and the inside of the lens barrel would appear in the exit pupil. Therefore, coincidence rangefinder systems in reflex cameras, adapted for use with interchangeable objective lens attachments, have been designed for the objective attachment having the smallest maximum relative aperture, and the sensitivity of the system is accordingly restricted to a commensurately narrow base separation. This limitation unnecessarily prevents utilization of the maximum potential focusing sensitivity of such cameras when a wider aperture lens is being used. For example, in a reflex camera adapted for use with interchangeable lenses having different maximum relative apertures ranging from $f/4$ to $f/1.4$, the wedges must be designed for the maximum focusing sensitivity which can be achieved with an $f/4$ lens. This sensitivity is not changed by the substitution of an $f/1.4$ lens which should be used with a system eight times more sensitive.

Summary of the invention

It is an object of the present invention to provide an improved coincidence rangefinder system having more than one sensitivity.

It is another object of this invention to provide a coincidence rangefinder system for reflex cameras having focus-indicating refracting means provided with more than one available light-deviating power for obtaining different focusing sensitivities for various objectives with different maximum relative apertures.

It is another object of this invention to provide a coincidence rangefinder system for reflex cameras having a focus indicator which automatically adjusts to vary the sensitivity of the indicator according to the maximum permissible sensitivity obtainable with the objective being used in the system.

According to the invention, coincidence rangefinder systems for indicating the focus condition of various objectives are provided in which the focus-indicator comprises refracting means having more than one available light-deviating power for increased focus sensitivity with wider aperture objectives. In one disclosed embodiment of the invention, the refracting means comprises two sections of a lens element which has been divided at one or more planes, preferably parallel to the optical axis of the element. These lens sections are mounted for movement with respect to the optical axis of the objective and each other to change the angle at which they deviate light from the objective, thereby providing means for changing the effective deviating power of the refracting means to vary the sensitivity of the system. According to another disclosed embodiment of the invention, the focus indicator comprises a plurality of adjacent pairs of crossed wedges with each pair having a different refracting power than the other pair or pairs. With the smallest objective aperture, the split image from only the weakest refracting pair is visible in the viewfinder, but with wider apertures the spit images viewed through others of the refracting elements are visible. Each of the disclosed embodiments of the invention provides a rangefinder having more than one sensitivity.

Description of preferred embodiments

Figure 1:
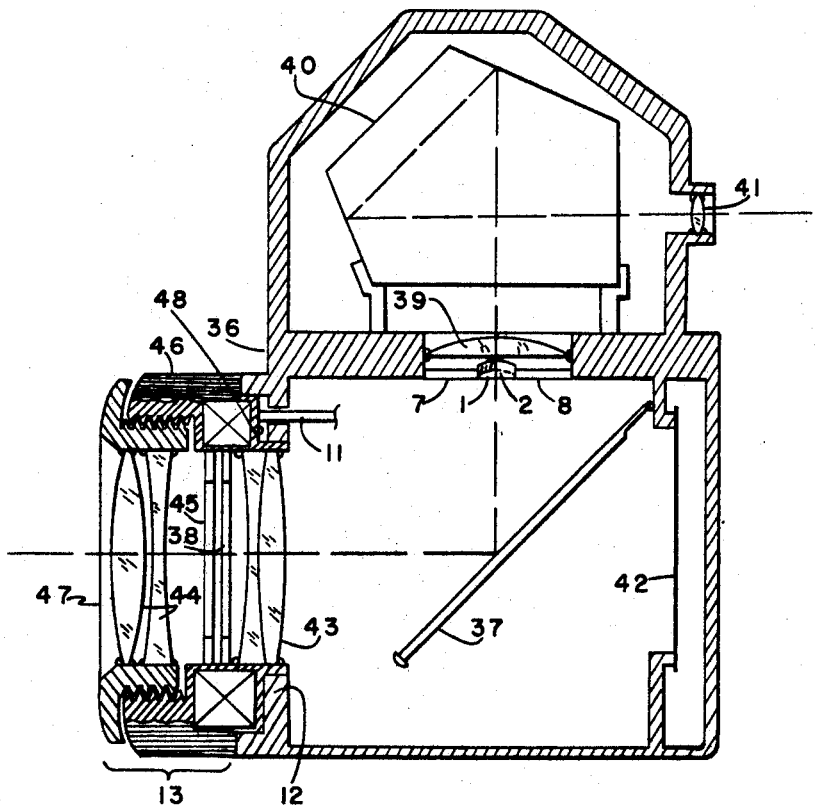
FIG. 1 is a vertical section through a reflex camera having a combined rangefinder-viewfinder with the rangefinder incorporating focus indicating refracting means according to one embodiment of the invention.

A reflex camera is shown in FIG. 1 having a body 36 with a mount 12 on which an objective lens attachment 13 is removably mounted. Objective attachment 13 comprises a lens barrel 46 in which are mounted a stationary rear lens group 43 and a front lens group 44 movable along the optical axis of the objective for focus adjustment by means of focus ring 47. A shutter 45 and a diaphragm 38 are located between these two lens groups. Objective lens attachment 13 is adapted to be removed from mount 12 for the substitution of other objective lens attachments, which may cover different field angles and may have different maximum relative apertures. Such objective attachments are each adapted, when mounted on the camera, for adjustment to focus an image on film 42. The objective lens attachment positioned on mount 12 directs incoming light rays either to the film 42 or onto a hinged mirror 37 which directs these rays to a combination viewfinder-rangefinder system. The viewfinder-rangefinder system comprises an image-splitting focus indicator 1 and 2 according to one embodiment of the invention, a field lens 39, a pentaprism 40, and an eyepiece 41. The image-splitting indicator is located in the primary image plane of the viewfinder-rangefinder at the same optical distance from the objective as the film 42, so that the position of the indicator coincides optically with the film plane. In this embodiment the image-splitting indicator comprises two refracting elements 1 and 2 mounted on slidably mounted ground glass plates 7 and 8, respectively. The positions of these plates, relative to each other and the optical axis of the objective, the primary image plane are controlled by rod 11, the longitudinal position of which is determined by index surface 48 on the objective attachment 46. The linking mechanism between rod 11 and plates 7 and 8 is illustrated in FIG. 3.

Figure 2:
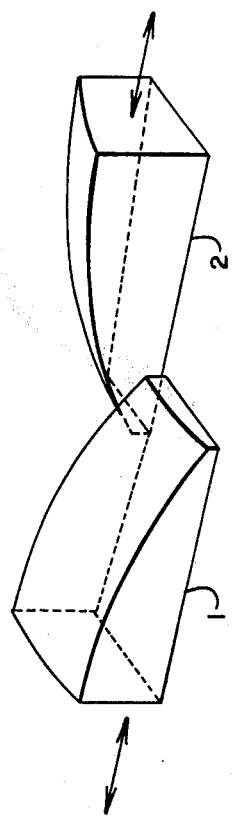
FIG. 2 is a perspective view of the focus indicating refracting elements employed in the FIG. 1 embodiment of the invention.

FIG. 2 shows an image-splitting pair of adjacent refracting elements 1 and 2 according to the FIG. 1 embodiment of the invention, in which each of the refracting elements is a section of a lens element which has been divided along at least one plane parallel to the optical axis of the original lens element. Although the lens sections shown in FIG. 2 are plano-convex, it will be apparent from the ensuing description that other forms of lens segments may be used in the practice of this invention. When incorporated in a rangefinder system, each lens section 1 and 2 in this embodiment is mounted for movement with respect to the other lens segment and with respect to the optical axis of the system. For ease in mounting the lens segments, their flat edges are in abutting relationship. The preferred mode of movement is in a direction parallel to their abutting surfaces and perpendicular to their optical axis, as indicated by the arrows. However, other modes of movement which change the relative position of the two elements with respect to the optical axis of the objective may be used in the practice of this invention.

Figure 3:
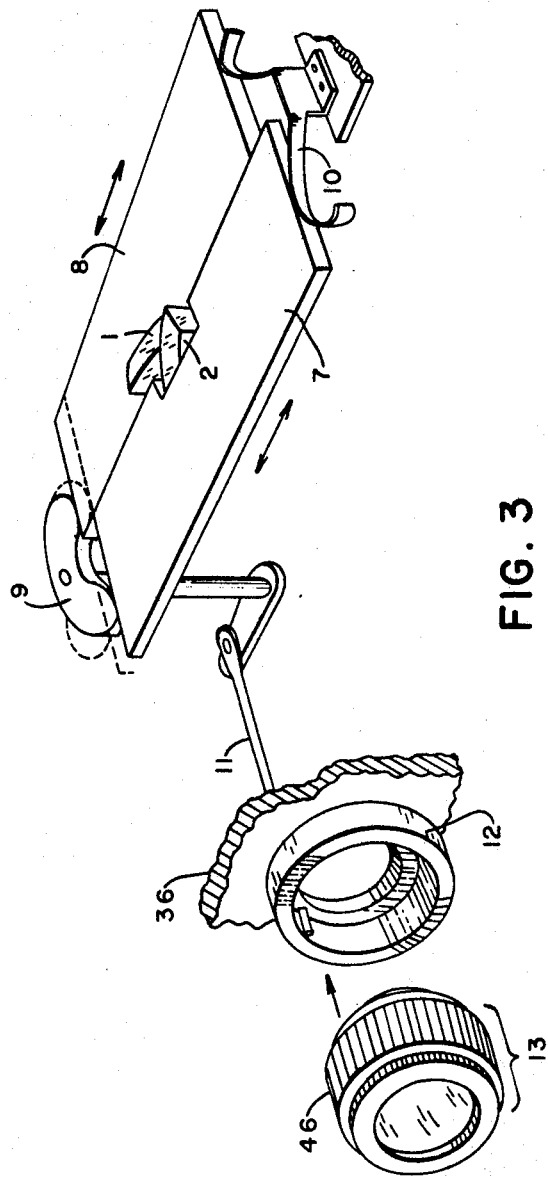
FIG. 3 is a perspective view of means for automatically adjusting the relative positions of the refracting elements, shown in FIG. 1, as a function of the maximum relative aperture of the objective in the system.

As seen in FIG. 3, the relative positions of image-splitting refracting elements 1 and 2 with respect to the optical axis of the rangefinder system shown in FIG. 1 may be controlled automatically to provide the correct angle of deviation corresponding to the maximum relative aperture of the objective being used in the system. The two refracting elements 1 and 2 are mounted on sliding plates 7 and 8 located in the primary image plane of the objective attachment 13. Spring 10 urges plates 7 and 8 against cam 9, the position of which is controlled by the linear movement of rod 11. Rod 11 passes through an opening in mount 12 and is adapted to contact the index surface 48, seen in FIG. 1, of mounted lens attachment 13. The index surface 48, indicative of the maximum relative aperture of lens attachment 13, adjusts the position of rod 11, such that lens sections 1 and 2 are held by cam 9 in the appropriate relative positions at which the maximum focusing sensitivity for the aperture of the attached lens is attained.

Figure 4A:
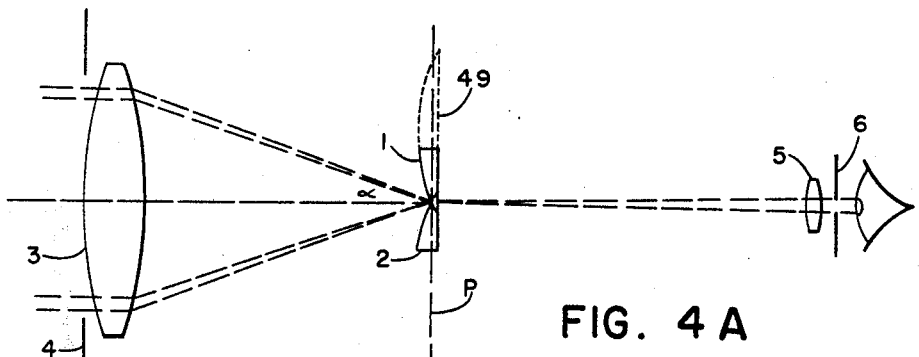
FIGS. 4A and 4B are schematic views illustrating the use of a rangefinder system employing the refracting elements shown in FIGS. 1–3 with a high aperture objective and a low aperture objective respectively.
Figure 4B:
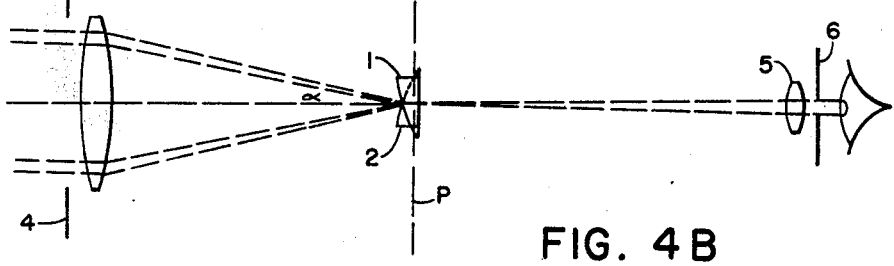

FIGS. 4A and 4B illustrate the optical effect of changing the relative positions of the pair of lens sections shown in FIGS. 1–3 with respect to the optical axis of a rangefinder system. The systems each include an objective 3 having an aperture defined by a diaphragm 4, an eyepiece 5 and an exit pupil 6. The objective 3 is mounted for adjustment to focus the image formed thereby in primary image plane P. Located substantially in the primary image plane are the image-splitting pair of refracting elements 1 and 2, which are adjacent to each other and to the optical axis of the objective.

The refracting elements 1 and 2 may comprise portions or sections of a lens, such as for example the plano-convex lens 49 illustrated in dashed lines in FIG. 4A. Although in this embodiment lens sections 1 and 2 comprise relatively small portions of the original lens element, the invention may be practiced using lens sections which comprise larger or smaller portions of the original lens element. It is also immaterial whether the section includes its optical axis. The relative portion of lens 49 used as a refractive element depends on design factors such as mounting and compactness requirements. For example, lens sections 1 and 2 may comprise two halves of a divided lens element.

Lens sections 1 and 2 are both adapted to form images of the exit pupil 6 on the objective 3, and such images constitute the effective optical entrance pupils of the system. The separation between these entrance pupils depends on the angle at which the lens sections 1 and 2 deviate light from the objective, which in turn depends on the relative distance and orientation of the optical axes of the lens sections 1 and 2 and with respect to the optical axis of the objective 3. This relation is due to the fact that the angle of deviation of light rays passing through a lens increases from a minimum at the optical axis of the lens to a maximum at the edges of the lens. Accordingly, movement of the lens sections to vary these distances and/or orientations changes the angle of deviation of light passing through the lens sections, thereby varying the separation between the entrance pupils and consequently varying the sensitivity of the system.

Since lens sections 1 and 2 are substantially in the primary image plane of the objective, they determine the area of the objective from which the image is formed without affecting the lateral position of the rangefinding image with respect to the optical axis of the objective when the objective is properly focused on that image plane. However, when the objective is not accurately focused, the image formed by the objective is not located in the primary image plane, and the two portions of the image seen through the refracting elements are displaced from optical alignment in opposite directions. The amount of image separation for a given displacement of the lens sections from the focal plane of the objective is directly related to the displacement and/or orientation of the optical center of each lens section with respect to the optical axis of the objective. When the objective 3 has a wide aperture as seen in FIG. 4A, the image-splitting means may deviate light from the objective at a relatively wide angle α with respect to the optical axis of the objective. Therefore, in FIG. 4A the lens sections 1 and 2 are positioned such that the portions of their refracting surfaces, which are more inclined with respect to the primary image plane, are adjacent the optical axis. This portion of each lens section deviates light at a greater angle than its thicker portion where the refracting surfaces approach being perpendicular to the optical axes. In FIG. 4B objective 3 has a smaller aperture than in FIG. 4A, and the angle α of image light deviation must be correspondingly smaller to avoid deviating the image out of the exit pupil. Therefore, the lens sections 1 and 2 are located such that their optical axes are closer to the optical axis of the objective.

As shown in FIG. 4, the lens sections have optical axes, which are parallel to the optical axis of the objective, and the sensitivity of the system is altered by varying only the distance between these axes. From the above description it should also be recognized that a change in the angle of deviation may also be caused by rotating the lens sections to change the relative orientation of the optical axes of the lens sections with respect to the optical axis of the objective.

Figure 5A:
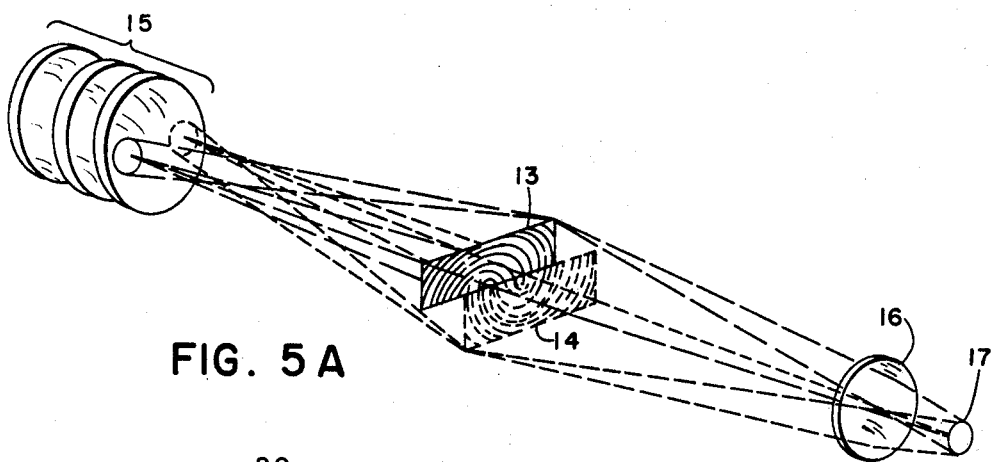
FIG. 5A is a perspective view of focus indicating refracting means in a rangefinder system according to an alternative embodiment of the invention.
Figure 5B:
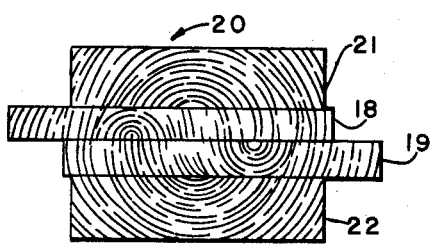
FIG. 5B is a plan view of an alternative construction of the focus indicating refracting means shown in FIG. 5A.

FIGS. 5A and B show alernative embodiments of the invention in which the focus indicator comprises movably mounted portions of a Fresnel lens. In the FIG. 5A embodiment, the two Fresnel lens sections 13 and 14 each comprise one-half of a Fresnel lens with the optical centers of each half displaced from the optical axis of the objective 15 the maximum distance permissible for that objective. As shown, the objective 15 is in focus since both portions of the image from the objective are centered in the exit pupil 17. The deviating power of the two Fresnel lens segments 13 and 14 is schematically indicated in FIG. 5A by light rays traced from the objective 15 through the two segments 13 and 14 to the exit pupil 17. In the FIG. 5B embodiment, lens sections 18 and 19 each comprise less than one half of the Fresnel lens 20 and the remaining portions 21 and 22 of the Fresnel lens are mounted in an optically centered position. This version of the invention avoids vignetting and increases illumination in the rangefinder.

The use of Fresel lenses also has an advantage of eliminating cross-field ranging error since the principal refracting planes of both ranging elements are coplanar. Consequently, no ranging variation may be detected as the subject image is moved across the split-image dividing line, as occurs in prior art crossed-wedge systems.

Figure 6:
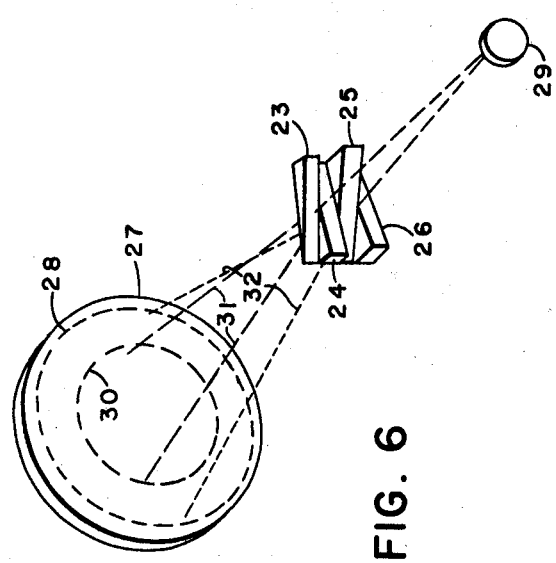
FIG. 6 is a perspective view of focus indicating refracting means in a rangefinder according to still another alternative embodiment of the invention.

FIG. 6 shows another alternative embodiment of the invention in which no movement of the image-splitting means is required. In this embodiment of the invention a plurality of pairs of crossed wedges are used, and each pair has a different refracting power than each of the other pairs. Wedges 23 and 24 are a pair of oppositely refracting prisms which have less refracting power than a second pair of wedges 25 and 26. When a high aperture objective 27 is used with a schematically indicated diaphragm 28, the light passing through all of the wedges is visible in the eyepiece 29. However, when the objective has a lower aperture as indicated schematically by diaphragm 30, only light rays 31 passing through the less powerful pair of wedges 23 and 24 are visible in the eyepiece 29. The light rays 32 which are visible at the high aperture through the high power wedges 25 and 26 do not appear in the eyepiece 29 when the low aperture objective is used.

Figure 7A:
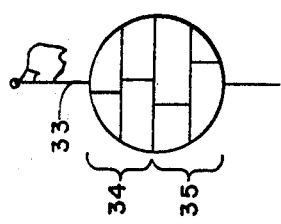
FIGS. 7A and 7B schematically illustrate views through the exit pupil of the system shown in FIG. 6 using wide aperture and low aperture objectives, respectively.
Figure 7B:
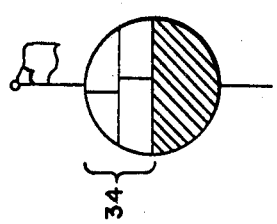

FIGS. 7A and 7B schematically illustrate the system disclosed in FIG. 6 as seen through the exit pupil with a high aperture and low aperture objective, respectfully. in FIG. 7A, an image of a vertical line is shown as it would appear through an out-of-focus, high aperture objective. Split image 35, seen through the higher power wedges is separated by a greater distance than split image 34 seen through the lower power pair of wedges. When the objective is used with a low aperture objective as illustrated in FIG. 7B, no image is visible through the higher power wedges, so that only split image 34 is visible through the eyepiece.

Although the invention has been described in detail with particular reference to preferred embodiments thereof, it will be understood that variations and modifications can be effected within the spirit and scope of the invention as described hereinabove and as defined in the appended claims.

I claim:

1. In a coincidence type rangefinder system having an adjustable objective for forming an image in a primary image plane, means for adjusting the objective to focus the image in said plane, and a focus indicator including light deviating refracting means positioned substantially in said plane for indicating the focus condition of the image, the improvement wherein said refracting means has more than one available light-deviating power for deviating light incident thereon from the objective at more than one angle, thereby providing the focus indicator with more than one focusing sensitivity.

2. The improvement according to claim 1, wherein said refracting means comprises a first pair of oppositely oriented refracting prisms for deviating a portion of said light at a first angle, and a second pair of oppositely oriented refracting prisms for deviating a second portion of said light at a second angle.

3. In a coincidence type rangefinder system having means for selectively mounting one of a plurality of interchangeable objectives in the system to form an image in a primary image plane, means for adjusting a mounted objective for focusing the image formed thereby in said plane, and a focus indicator including light deviating refracting means positioned substantially in said plane for indicating the focus condition of the image, the improvement wherein said refracting means has more than one available light-deviating power for deviating light incident thereon from the mounted objective at more than one angle, thereby providing the focus indicator with more than one focusing sensitivity.

4. In a coincidence type rangefinder system having an adjustable objective for forming an image in a primary image plane, means for adjusting the objective to focus the image in said plane, and a focus indicator positioned substantially in said plane for indicating the focus condition of the image, the improvement wherein said focus indicator comprises:
   refracting means movably mounted in said plane for deviating light incident thereon from the objective; and
   means for moving said refracting means to vary the deviation of said light, thereby providing the focus indicator with a variable sensitivity.

5. In a coincidence type rangefinder system having means for selectively mounting one of a plurality of interchangeable objectives in the system to form an image in a primary image plane, means for adjusting a mounted objective for focusing the image formed thereby in said plane, and a focus indicator for indicating the focus condition of the image, the improvement wherein said focus indicator comprises:
   refracting means movably mounted substantially in said plane for deviating light incident thereon from the mounted objective; and
   means for adjusting the position of said refracting means to vary the deviation of said light, whereby the sensitivity of the focus indicator may be adjusted to attain maximum sensitivity for each mounted objective.

6. In a coincidence type rangefinder system having means for selectively mounting one of a plurality of interchangeable objectives in the system to form an image in a primary image plane, means for adjusting a mounted objective for focusing the image formed thereby in said plane, and a focus indicator for indicating the focus condition of the image, the improvement wherein said focus indicator comprises:
   at least one lens section movably mounted substantially in the primary image plane for deviating light incident thereon from the mounted objective; and
   means for moving said lens section with respect to the optical axis of the mounted objective to vary the deviation of said light, thereby providing the focus indicator with a variable sensitivity.

7. The improvement according to claim 6, wherein said lens section comprises a portion of a Fresnel type lens element.

8. In a coincidence type rangefinder system having means for selectively mounting one of a plurality of interchangeable objectives in the system to form an image in a primary image plane, means for adjusting a mounted objective for focusing the image formed thereby in said plane, and a focus indicator for indicating the focus condition of the image, the improvement wherein said focus indicator comprises:
   a pair of lens sections movably mounted substantially in said plane for oppositely deviating light incident thereon from the mounted objective; and
   means for moving said lens sections with respect to the optical axis of the mounted objective to vary the deviation of said light.

9. The improvement according to claim 8 wherein the lens sections each comprise one-half of a lens element divided by a plane including the optical center line of the lens element.

10. The improvement according to claim 8 wherein the lens sections are portions of a Fresnel lens.

11. In a reflex camera having means for selectively mounting interchangeable objectives, each objective being adapted when mounted on the camera to form an image in a primary image plane, and having means for adjusting a mounted objective to focus the image formed thereby in said plane, a rangefinder system of the coincidence type for indicating the focus condition of the mounted objective, comprising;
   refracting means movably mounted substantially in said plane for deviating light incident thereon from the mounted objective, and
   means for moving said refracting means with respect to the optical axis of the mounted objective to vary the deviation of said light, thereby providing the rangefinder system with a variable focusing sensitivity.

12. The rangefinder system according to claim 11, wherein said refracting means comprises a pair of lens sections.

13. In a reflex camera having means for selectively mounting interchangeable objectives having different relative apertures, each objective being adapted when mounted on the camera to form an image in a primary image plane, and having means for adjusting a mounted objective to focus the image formed thereby in said plane, a focus indicator comprising:
   refracting means movably mounted substantially in said primary image plane for deviating light incident thereon from the objective,
   indexing means on said mounted objective positioned to indicate the maximum relative aperture of the objective,
   means for sensing the position of said indexing means, and
   means connecting said sensing means and said refracting means for moving said refracting means relative to the optical axis of the mounted objective to a position at which the maximum focusing sensitivity for the relative aperture of the mounted objective is attained.

14. A focus indicator according to claim 13, wherein said refracting means comprises a pair of lens sections.

References Cited

UNITED STATES PATENTS 2,985,084  5/1961  Gebele _____ 95—44
3,003,407  10/1961 Grey _____ 95—44

JOHN M. HORAN, Primary Examiner

R. L. MOSES, Assistant Examiner

U.S. Cl. X.R.

88—1.5; 95—42